Sept. 15, 1931.  J. H. VICTOR  1,823,342
GASKET
Filed Jan. 17, 1930
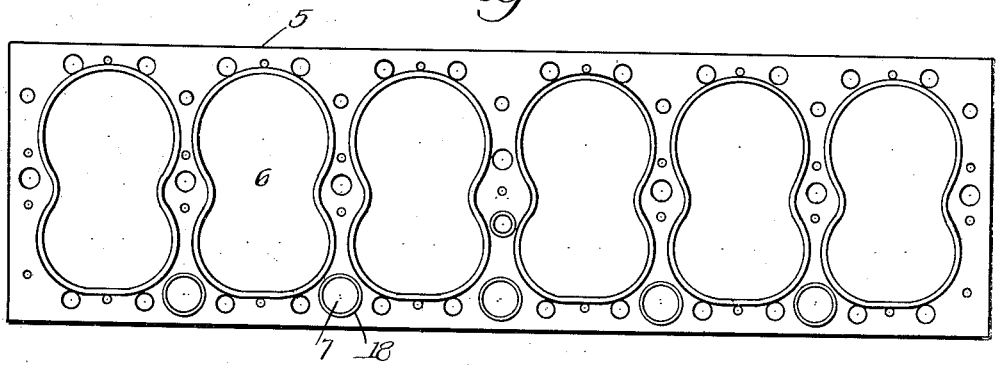
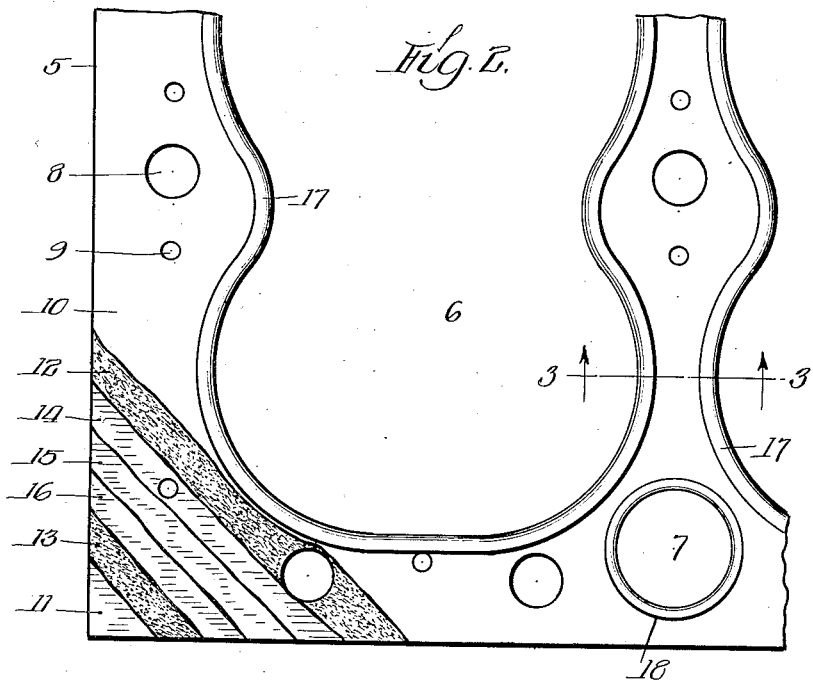
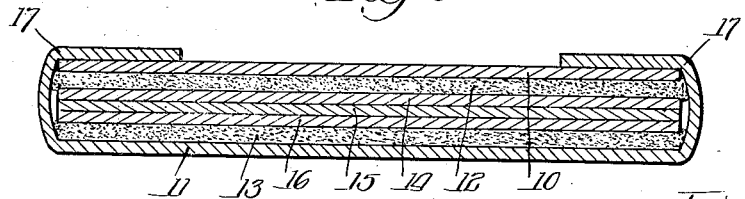

Patented Sept. 15, 1931

1,823,342

UNITED STATES PATENT OFFICE

JOHN H. VICTOR, OF EVANSTON, ILLINOIS, ASSIGNOR TO VICTOR MANUFACTURING & GASKET COMPANY, OF CHICAGO, ILLINOIS, A CORPORATION OF ILLINOIS

GASKET

Application filed January 17, 1930. Serial No. 421,568.

This invention relates to gaskets and it is particularly useful in gaskets of comparatively large size and which have narrow transverse sections like the gaskets employed for sealing the joint between the head and the block of an internal combustion engine. In my co-pending application filed concurrently herewith, Serial No. 421,567, I have explained the necessity for reinforcing gaskets to insure a tight seal between the head and the block of an internal combustion engine against the stresses and strains of continuous operation under the conditions of heavy loads, high speed and extreme heat.

The object of this invention is to provide a gasket of strong and substantial construction especially adapted for heavy duty work which is sufficiently yielding to accommodate irregularities and unevenness in the surfaces of the joint to which it is applied while being sufficiently rigid to maintain its shape during shipping and handling, and which is reinforced and strengthened so that at its narrowest sections it will resist the extremes of heat and pressure under the most severe conditions.

With these and other ends in view I have illustrated the invention in an engine head gasket provided with cylinder openings and referring thereto, Fig. 1 is a plan view of one form of gasket selected for illustration.

Fig. 2 is an enlarged fragmentary view with parts broken away.

Fig. 3 is an enlarged sectional view on the line 3—3 of Fig. 2.

Referring to the drawings, the gasket 5 has a plurality of cylinder openings 6, water circulation openings 7, bolt openings 8, and water ports 9. The cylinder openings are located close together to conform with the block construction and they provide a number of narrow sections as indicated at line 3—3 of Fig. 2. The gasket comprises two outer or facing members or layers 10, 11 which are stamped from thin sheet metal, preferably copper; two layers of refractory material 12, 13, preferably asbestos, in contact with the inner surfaces of the facing members; and three reinforcing layers 14, 15, 16 stamped from thin sheet metal, preferably steel, and arranged one upon the other between the two asbestos layers. The facings and layers are in skeleton sheet form, and each is of uniform thickness throughout to form a compact body with the layers resting snugly one upon the other in the form of laminations and all of substantially uniform shape with all of their openings in registration. The three steel layers constitute a substantial reinforcing core for the gasket which is as strong as a solid core of equal thickness would be but has the advantage of greater flexibility. The asbestos layers are located between the core and the facings and yield with the facings to accommodate irregularities and unevenness in the facings of the joint. The facings and layers are held together with sufficient rigidity by the beads 17 on one facing about the cylinder openings 6 which overlap the marginal edges of the openings in the other facing. Some of the smaller openings, as 7, may be provided with similar beads 18 which will co-operate with the beads 17 to maintain the parts of the gasket in rigid alinement. The present invention provides a gasket of special strength laterally which will resist the strains to which the gasket is subjected by engine pressure. This pressure is exerted on the gasket to the greatest extent at the narrow sections of the gasket between cylinders where it is subjected to pressure at both edges, tending to shift these sections laterally and break the seal and permit leakage which soon results in destructive damage to the gasket. This invention provides a particularly strong and efficient gasket which is calculated to resist the strains of heat and pressure of modern high compression engines. The arrangement of layers provides a well-balanced gasket with the reinforcement evenly distributed therethrough which make it especially desirable for use in gaskets of large skeleton formation having many openings and narrow sections.

I have shown the invention in this form in the drawings but it is also useful in other forms of large gaskets, as well as in smaller gaskets, such as those employed in the engine exhaust; and changes may be made in the form, construction and arrangement of parts and materials to adapt the invention for different uses within the scope of the following claim.

I claim:

A cylinder head gasket having a plurality of openings therein and comprising soft metal facings and an interposed reenforcing core, said core comprising a plurality of centrally disposed relatively hard metal layers arranged in surface contact one upon the other to provide substantial flexibility throughout the area of said gasket and layers of compressible material disposed between the facings and the hard metal layers and in surface contact therewith, all of said layers being compactly secured together.

JOHN H. VICTOR.